Patented June 19, 1928.

1,673,969

UNITED STATES PATENT OFFICE.

CLINTON E. DOLBEAR, OF LOS ANGELES, CALIFORNIA.

RECOVERY OF SOLUBLE SALTS FROM NATURAL BRINES OR THE LIKE.

No Drawing.   Application filed May 3, 1927. Serial No. 188,609.

This invention relates, primarily, to the recovery of soluble salts from natural brines or the like, and involves a unique process therefor.

The essential object is to effect recovery of potassium salts, borax and sodium carbonate from a mixture of these salts, and others, and from each other.

Another object is more specifically to recover potassium salts, borax and sodium carbonate from mixtures of sodium chloride, sodium sulfate, sodium carbonate, a potassium salt, and borax in solid state, such as can be obtained from evaporation of the natural brines occurring at Searles Lake, located in San Bernardino County, State of California, and elsewhere. The Searles Lake brine has a content substantially as follows:

|   | Per cent. |
|---|---|
| Potassium chloride | 4.75 |
| Borax (anhydrous) | 1.60 |
| Sodium carbonate | 4.70 |
| Sodium chloride | 16.50 |
| Sodium sulfate | 6.90 |
| Water | 65.65 |

More or less broadly expressed, the process comprises leaching the mixture of solid salts with a hot solution which contains sodium chloride, sodium sulfate, sodium borate and a potassium salt, these salts not being in solution-equilibrium with each other when the solution is either hot or cold, there being a sufficient amount of calcium oxide, or its equivalent, to convert all, or a substantial portion, of the sodium tetra-borate to sodium meta-borate.

It is, of course, contemplated that the addition of a caustic soda to the solution will accomplish the same result. I use calcium oxide or calcium hydroxid, however, because it is more convenient and less expensive.

The relative amounts of the named salts present in the solution will automatically adjust themselves, as illustrated below.

A simple method of production of such a solution is as follows: Water may be boiled in contact with an excess of all of the salts of the mixed salts to be leached until it becomes saturated with each and all of these salts. The resultant solution is then separated from the undissolved excess salts and allowed to cool. During the cooling, potassium salt and borax will, in part, separate from the solution. The cold solution is thereupon separated from the deposited salts, and is then subjected to the action of carbon dioxid, whereby all of the contained sodium carbonate is converted to sodium bicarbonate which, being nearly insoluble in the solution, is mostly deposited therefrom. The solution is then separated from the deposited sodium bicarbonate. This last solution is of the charatcer which I use to leach the mixed solid salts above referred to.

In practice, this last-mentioned solution is heated and then brought in contact with the mixed solid salts to be leached, together with a sufficient amount of calcium oxide, or its equivalent, to convert all, or a sufficient amount, of the contained sodium tetra-borate into sodium meta-borate—which is much more soluble than sodium tetra-borate—so that, when the solution is cooled, none of the contained borate can deposit therefrom. The particular object of this step is to insure non-separation of the borate from the solution during the cooling thereof, after leaching of the solid mixed salts.

The hot solution, in contact with the mixed solid salts, dissolves therefrom the potassium salt and borax, for these last-named salts are much more soluble in the hot solution than they were when the solution was cold.

Owing to its previous treatment with carbon dioxid, and the subsequent contact with calcium oxid, the leaching solution contains no sodium carbonate and, consequently, dissolves sodium carbonate from the solid mixed salts.

In the case of mixed salts of the aforementioned relative composition contained in salts from Searles Lake brine, if the amount used of the mixed salts and the leaching solution are so proportioned that a minimum portion of the solution will just dissolve all of the potassium salt of the solid mixed salts, it usually will also dissolve all of the borax and all of the sodium carbonate of the mixed solid salts, leaving sodium chlorid and sodium sulfate, alone, undissolved.

When the potassium salt, borax and sodium carbonate have dissolved from the solid mixed salts as completely as desired, the hot solution is separated from the undissolved solid salts by appropriate means, such (for instance) as in a centrifuge, and the solution is cooled to any desired temperature, whereby the potassium salt alone deposits therefrom.

The cooled solution is separated from the deposited potassium salt, and the latter is lightly washed to remove any adhering mother liquor and it is, then, in substantially pure condition, usually requiring no further refining.

The cooled solution is then subjected to the action of carbon dioxid until the contained sodium meta-borate is converted to sodium tetra-borate. Sodium tetra-borate, being much less soluble than was the sodium meta-borate, crystallizes from the solution as borax. The solution is separated from the deposited borax by appropriate means, such as in a centrifuge, and the borax is lightly washed to remove any adhering mother liquor and is, then, in substantially pure condition without further refining.

The solution is next subjected to the action of carbon dioxide until all of the contained sodium carbonate is converted to sodium bicarbonate. The latter is very little soluble in the solution, and mostly separates therefrom. The deposited sodium bicarbonate is separated from the solution by appropriate means, such (for instance) as in a centrifuge, and is lightly washed to remove any adhering mother liquor and is, then, in substantially pure condition, ready to be sold as bicarbonate of soda, or to be reduced to soda ash by calcination.

The mother liquor from the sodium bicarbonate is then used to dissolve more potassium salt, borax and sodium carbonate from more solid mixed salts, with more calcium oxide, or its equivalent, thus completing the cycle and providing a means whereby the same solution may be used over and over, indefinitely.

What I claim is:

1. The method of recovering a potassium salt, borax and sodium carbonate from a mixture of a potassium salt, borax, sodium carbonate, sodium sulfate and sodium chlorid, including the steps of converting a portion of the borax to sodium meta-borate, leaching the solid mixed salts with a hot solution containing a potassium salt, a sodium borate, sodium sulfate and sodium chlorid, separating the hot solution from the undissolved solid salts, cooling the solution, separating the deposited potassium salt from the cooled solution, subjecting the cooled solution to the action of carbon dioxid, separating the deposited borax from the solution, subjecting this solution to the action of carbon dioxid, separating the deposited sodium bicarbonate from the solution, and using this final solution as the initial solution wherewith to dissolve the potassium salt, sodium borate and sodium carbonate from more of the mixed solid salts to repeat the cycle.

2. The method of recovering a potassium salt, borax and sodium carbonate from a mixture of a potassium salt, borax, sodium carbonate, sodium chlorid and sodium sulfate in solid state, which includes dissolving the potassium salt, borax and sodium carbonate from the solid mixed salts by means of a hot solution containing sodium chlorid, sodium sulfate, sodium borate and a potassium salt in the presence of calcium oxide, separating the hot solution from the undissolved portion of the solid salts, cooling the solution, separating therefrom the deposited potassium salt, subjecting the cooled solution to the action of carbon dioxid until the contained borate is converted to sodium tetra-borate, separating the deposited borax from the solution, subjecting the solution to the action of carbon dioxid until the contained sodium carbonate is converted to sodium bicarbonate, separating the deposited sodium bicarbonate from the solution, and using the solution to dissolve more potassium salt, borax and sodium carbonate from more mixed solid salts to repeat the cycle.

3. The method of recovering a potassium salt, borax and sodium carbonate from mixtures thereof, with sodium chlorid and sodium sulfate in solid state, which includes leaching the mixed solid salts in the presence of calcium oxide with a hot solution containing potassium, a sodium borate, sodium chlorid and sodium sulfate, separating the hot solution from the undissolved portion of the solid salts, cooling the solution, separating the deposited potassium salt from the cooled solution, subjecting the cooled solution to the action of carbon dioxid until substantially all borates therein are converted to sodium tetra-borate, separating the deposited borax from the solution, subjecting the solution to the action of carbon dioxid until the sodium carbonate contained therein is converted to sodium bicarbonate, separating the deposited sodium bicarbonate from the solution, and using this solution, reheated and in the presence of calcium oxide, to dissolve more potassium salt, borax and sodium carbonate from more mixed solid salts to repeat the cycle.

4. The method of recovering a potassium salt, borax and sodium carbonate from mixtures thereof, with sodium chlorid and sodium sulfate in solid state, which includes the step of leaching the mixed solid salts in the presence of calcium oxide with a hot solution containing potassium, a sodium borate, sodium chlorid and sodium sulfate.

5. The method of recovering a potassium salt, borax and sodium carbonate from mixtures thereof, with sodium chlorid and sodium sulfate in solid state, which includes the steps of leaching the mixed solid salts in the presence of calcium oxide with a hot solution containing potassium, a sodium borate, sodium chlorid and sodium sulfate, cooling the solution, and subjecting it successively to the action of carbon dioxid and effecting separation of the borates and sodium carbonate.

6. The method of recovering a potassium salt, borax and sodium carbonate from mixtures thereof, with sodium chlorid and sodium sulfate in solid state, which includes the steps of leaching the mixed solid salts in the presence of calcium oxide with a hot solution containing potassium, a sodium borate, sodium chlorid and sodium sulfate, cooling the solution and subjecting it successively to the action of carbon dioxid and effecting separation of the borates and sodium carbonate, and re-using the resultant solution in a succeeding recovery-cycle.

In testimony whereof I affix my signature.

CLINTON E. DOLBEAR.